(12) United States Patent
Liu et al.

(10) Patent No.: US 6,342,320 B2
(45) Date of Patent: *Jan. 29, 2002

(54) ELECTROCHEMICALLY STABLE PLASTICIZER

(75) Inventors: Peikang Liu, Henderson; Porter Mitchell, Las Vegas; Jeffrey Swoyer; Jeremy Barker, both of Henderson, all of NV (US)

(73) Assignee: Valence Technology, Inc., Henderson, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,660

(22) Filed: Feb. 27, 1998

Related U.S. Application Data

(63) Continuation-in-part of application No. 08/839,006, filed on Apr. 23, 1997, now Pat. No. 5,964,903.

(51) Int. Cl.[7] .......................... H01M 2/16; H01M 10/40
(52) U.S. Cl. ...................... 429/307; 429/212; 429/217; 429/254
(58) Field of Search ................................ 429/307, 212, 429/217, 254; 29/623.4

(56) References Cited

U.S. PATENT DOCUMENTS

| 4,237,083 A | 12/1980 | Young et al. | |
| 4,728,588 A | 3/1988 | Noding et al. | 429/127 |
| 5,057,565 A | 10/1991 | Noding et al. | 524/109 |
| 5,143,805 A | * 9/1992 | Anderman et al. | 429/217 |
| 5,296,318 A | 3/1994 | Gozdz et al. | 429/192 |
| 5,514,461 A | 5/1996 | Meguro et al. | |
| 5,538,811 A | 7/1996 | Kanbara et al. | 429/192 |
| 5,540,741 A | 7/1996 | Gozdz et al. | 29/623.5 |
| 5,597,662 A | * 1/1997 | Isaacson et al. | 29/623.4 X |
| 5,720,780 A | 2/1998 | Liu et al. | |
| 5,964,903 A | * 10/1999 | Gao et al. | 429/303 X |

FOREIGN PATENT DOCUMENTS

| JP | 08 064200 A | 3/1996 |
| JP | 08 096849 A | 4/1996 |
| WO | WO 96 21639 A | 7/1996 |
| WO | WO 98 48469 A | 10/1998 |

* cited by examiner

*Primary Examiner*—Stephen Kalafut
(74) *Attorney, Agent, or Firm*—Harness, Dickey & Pierce, P.L.C.

(57) ABSTRACT

A laminate structure or precursor paste thereof characterized by being formed from a composition comprising a polymeric material and a plasticizer. The plasticizer being at least one compound represented by the following general formula

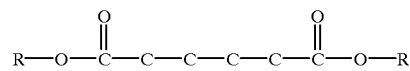

where R is a low alkyl selected from the group consisting of methyl, ethyl, butyl, pentyl and hexyl.

13 Claims, 5 Drawing Sheets

ELECTROCHEMICALLY STABLE PLASTICIZER

RELATED APPLICATION DATA

This application is a continuation-in-part of U.S. Ser. No. 08/839,006 to Gao et al. filed Apr. 23, 1997 which has since issued as U.S. Pat. No. 5,964,903 on Oct. 12, 1999.

FIELD OF THE INVENTION

This invention relates to electrochemical cells and batteries, and more particularly, to lithium ion cells and batteries.

BACKGROUND OF THE INVENTION

Lithium batteries are prepared from one or more lithium electrochemical cells. Such cells have included an anode (negative electrode), a cathode (positive electrode), and an electrolyte interposed between electrically insulated, spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

The lithium metal anode has been replaced with a carbon anode, that is, a carbonaceous material, such as non-graphitic amorphous coke, graphitic carbon, or graphites, which are intercalation compounds. This presents a relatively advantageous and safer approach to rechargeable lithium as it replaces lithium metal with a material capable of reversibly intercalating lithium ions, thereby providing the so-called "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte usually comprising a lithium salt dissolved in nonaqueous solvent or a mixture of such solvents. Numerous such electrolytes, salts, and solvents are known in the art.

In the manufacturing of a battery or a cell utilizing a lithium-containing electrode, there is an attempt to eliminate as many undesirable impurities and unstable precursor components as possible. Such undesirable impurities and precursors adversely affect cell performance.

In a lithium battery or cell, it is important to eliminate as many impurities and some precursor components which may affect cell performance. Such impurities and precursor components cause side reactions and are subject to breakdown because they are not electrochemically stable. Loss of performance due to impurities and breakdown of precursor compounds causing undesired side reactions has led to the formation of cell components and assembly of the cell under very controlled conditions. Performance problems have also led to the removal and extraction of as many impurities and precursor components as possible in order to minimize problems. However, extraction techniques for removing such undesired compounds are very time-consuming and very costly. Therefore, what is needed is an understanding of the mechanism causing undesired loss of performance and the resolution of same, which avoids the need for costly and time-consuming process steps; and a new method for forming battery components which avoids the need for costly extraction and purification steps.

SUMMARY OF THE INVENTION

The present invention provides a novel composition from which electrochemical cell component films are fabricated which avoids undesired electrochemical breakdown of cell components; and which avoids the need for complex purification steps to reduce or substantially eliminate precursor components subject to electrochemical breakdown.

The components of the cell are formed from a specifically selected class of new plasticizers which are resistant to decomposition by electrochemical breakdown. The new class of plasticizers are characterized by electrochemical stability at least up to about 4.5 volts.

In addition to their electrochemical stability, the plasticizers of the invention have properties similar to those desired in an electrolyte solvent.

The plasticizers of the invention are generally characterized as dibasic esters based on adipates. They have the general formula as shown in Table I, where "R" represents a low alkyl selected from methyl, ethyl, propyl, butyl, pentyl and hexyl. Accordingly, "R" represents a low alkyl, having up to six carbon atoms. The plasticizers of the invention are further characterized by electrochemical stability up to about 4.5 volts, and by disassociatingly solubilizing the metal salt of the electrolyte. The plasticizers of the invention have characteristics consistent with desired electrolyte solvents, and they may be used as all or part of the solvent mixture. However, it is preferred to remove at least a portion of the plasticizer after casting the film.

The characteristics of the plasticizer include the ability to disassociatingly solubilize the metal salt used for ion transport in an electrochemical cell. Advantageously, the plasticizer need not be extracted completely from precursor components, the electrode and/or electrolyte, before final assembly of the cell. This is because the plasticizer and the solubilized salt become distributed within the separator of the completed cell where the plasticizer along with other components of the solvent mixture are dispersed for ion transport. Preferably, the solvent mixture comprises, besides the plasticizer, at least one of those solvents selected from the group consisting of ethylene carbonate (EC), dimethyl carbonate (DMC), diethyl carbonate (DEC), dipropyl carbonate (DPC), dibutyl carbonate (DBC), diethoxy ethane (DEE), ethyl methyl carbonate (EMC), butylene carbonate (BC), vinylene carbonate (VC), propylene carbonate (PC), and mixtures thereof. Since the plasticizer is not a preferred solvent, it preferably constitutes a relatively small portion of the solvent mixture. The plasticizer is preferably present in an amount less than the amount by weight of any other one of the solvents included in the mixture. Advantageously, the plasticizer is miscible with the aforesaid common solvents. Other characteristics of the dibasic esters of the invention based on adipate include, based on the exemplary dimethyl adipate (DMA), a boiling point of 109–110° C.; a melting point of about 8° C.; vapor pressure of about 0.2 mm; specific gravity of about 1.063; and purity on the order of 98–99%. The plasticizer in appearance is a colorless liquid, dialkyl adipate.

Although the plasticizer of the invention may remain as a part of the cell component (electrode and/or separator) after its fabrication, it is preferred to remove at least a portion of the plasticizer. In any event, the solubilizing plasticizer of the invention, forming a part of the solvent mixture, is present in an amount not greater than the amount by weight of any other one of the organic solvent components. The preferred plasticizers are dimethyl adipate (DMA) and diethyl adipate (DEA). The characteristics of dimethyl adipate (DMA) as outlined above are shown in Table II. The preferred dimethyl adipate is shown as an entry in chemical structural formula in Table I.

The electrochemical cell of the invention comprises a first electrode; a counter-electrode which forms an electrochemical couple with the first electrode; and an electrolyte. The electrolyte comprises the solute in solvent mixture. The solute is essentially a salt of the metal. In the case of a lithium ion battery, this is a lithium salt, such as $LIPF_6$. According to the invention, at least one of the electrodes comprises an active material; a polymeric material functioning as a binder; and a plasticizer for the polymeric material, where the plasticizer is at least one compound selected from the group of dibasic esters derived from adipate, according to the invention. Preferably, in the case of a metal oxide electrode, the electrode composition further comprises a conductive diluent such as graphite. The preferred polymeric binder material is preferably a co-polymer of polyvinylene difluoride (PVDF) and hexafluoropropylene (HFP). In another aspect, the electrolyte/separator film is formed from the co-polymer and plasticizer.

The plasticizers of the invention solve the difficult processing problems associated with removal of conventional plasticizers after formation of cell components and before their assembly into a cell. The plasticizer of the invention may be used to formulate any of the polymeric components of the cell, positive electrode, negative electrode, and electrolyte/separator. Plasticizers of the invention comprising adipate derivatives, esters, are highly desirable due to their stability. Plasticizers of the invention are stable under atmospheric conditions on exposure to oxygen, humidity, and importantly, are electrochemically stable. This is in contrast to plasticizers conventionally used to form cell components. Such conventional plasticizers must be removed prior to assembly of the cell as they are not electrochemically stable. An additional advantage is that the plasticizer of the invention has characteristics consistent with properties desired for a solvent and functions as a part of the solvent mixture when included in an electrochemical cell. Therefore, advantageously, the plasticizers of the invention become part of the electrode formulation performed characteristic function as a plasticizer during formation of cell components from precursor compounds, and then they remain as a part of the cell component when the cell is assembled.

Objects, features, and advantages of the invention include an improved electrochemical cell or battery having improved charging and discharging characteristics; which maintains its integrity over a prolonged life cycle as compared to presently used batteries and cells. Another object is to provide electrode mixtures comprising constituents which are stable when cycled in an electrochemical cell, and which demonstrates high performance, and which does not readily decompose during cell operation. It is also an object of the present invention to provide cells which can be manufactured more economically and conveniently, and to provide cells with electrode and electrolyte components which are compatible with one another, avoiding problems with undesired reactivity, breakdown, and degradation of cell performance.

These, and other objects, features, and advantages, will become apparent from the following description of the preferred embodiments, claims, and accompanying drawings.

BRIEF DESCRIPTION OF THE DRAWINGS

FIG. 1 shows a voltage/capacity plot for BG-35 graphite carbon electrode cycled with the lithium metal counterelectrode, using constant current cycling at ±0.2 milliamps per square centimeter, between 0.01 and 2.0 volts, using 42 milligrams of the BG-35 active material. Here, the electrolyte constitutes a mixture of 95% EC/DMC, $LiPF_6$ and 5% DMA, more specifically: 5% DMA (or 5 gram)+ 95% (or 95 gram) of 1M EC/DMC, $LiPF_6$ electrolyte.

FIG. 2 is a voltage/ capacity plot for the SFG-15/MCNB graphite carbon electrode cycled with a lithium metal counterelectrode using constant current cycling at ±0.2 milliamps per square centimeter, between 0.01 and 2.0 volts, using 36 mgs of the graphite active material. The electrolyte is one molar LiPF6 in a solution of EC/DMC. The weight ratio of solvent is 2:1 of EC/DMC. In the formulation of FIG. 2, the DMA plasticizer was essentially completely removed by methanol extraction.

DETAILED DESCRIPTION OF THE PREFERRED EMBODIMENTS

Figure 1:
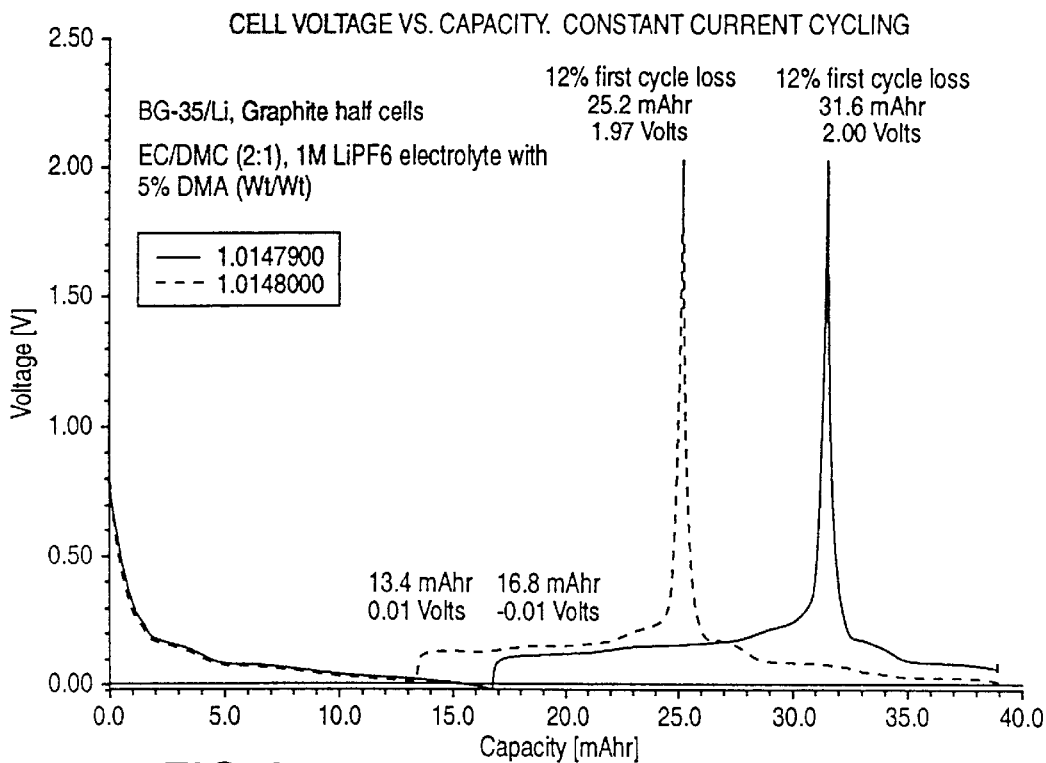
FIG. 1 shows the performance of two cells prepared with a negative electrode (anode) of carbonaceous material designated as BG-35 cycled against a lithium metal electrode. The electrolyte is EC/DMC (ethylene carbonate/ dimethyl carbonate) in a ratio by weight of 2:1; one molar LiPF6 electrolyte; and including 5 percent by weight dimethyl adipate.

The invention provides, for the first time, a key cell component which is stabilized against decomposition during cyclic operation of an electrochemical cell. The components of the cell are formed from a specifically selected class of new plasticizers which are resistant to decomposition by electrochemical breakdown. Such decomposition and resultant formation of byproducts, including gaseous byproducts, are problems encountered with conventional plasticizers used today. Advantageously, the plasticizer selected for use in the present invention performs a dual function as both a plasticizer and electrolyte solvent. Such dual function compound has heretofore not been suggested. Before further describing the invention, it is useful to understand problems associated with present electrode and electrolyte formulations using conventional plasticizers.

Conventional plasticizers, such as DBP (dibutyl phthalate) are included in the precursor formulation from which electrode and separator elements are formed. Other common plasticizers include dimethyl phthalate, diethyl phthalate, trisbutoxyethyl phosphate, and trimethyl trimellitate. The DBP (dibutyl phthalate) is particularly preferred for use in combination with polymeric materials such as VdF (vinylidene fluoride) and HFP (hexafluoropropylene), PVc, PAN and the like.

Referring to U.S. Pat. Nos. 5,418,091; 5,456,000; 5,460,904; and 5,540,741; it can be seen that such plasticizers are essentially completely extracted immediately after formation of the cell component, and before assembly of the completed cell. It is necessary to essentially completely remove the plasticizer, DBP and the like, because they are not electrochemically stable and will decompose and interfere with cell performance. Each of the four aforesaid patents is incorporated herein by reference in its entirety, describing negative electrode, positive electrode, and electrolyte formulations with removal of plasticizer before making a cell. The present invention obviates the need for costly and time-consuming removal of plasticizer.

In view of the difficulties mentioned above, very elaborate extraction techniques are used to remove the plasticizer after it has imparted the necessary properties to the precursor cell components. The plasticizer is removed either by solvent extraction, where it is transferred to a liquid solvent phase from which it may be readily recovered, or by vacuum extraction. Those skilled in the art will understand that solvent extraction and vacuum extraction are energy intensive, complex, require series of steps, good process control, and are very costly.

The present invention defines a new approach to solving the problem. By the present invention, a new class of plasticizers are selected which are electrochemically stable and have properties similar to those desired in an electrolyte solvent. Such novel plasticizers may remain in the cell component after fabrication where they function as part of the solvent mixture. The plasticizers of the invention are generally characterized as dibasic esters based on adipates. They have the general formula as shown in Table I, where "R" represents a low alkyl selected from methyl, ethyl, butyl, pentyl, and hexyl. Accordingly, "R" represents a low alkyl, having up to six carbon atoms. The plasticizers of the invention are further characterized by electrochemical stability up to about 4.5 volts, and by disassociatingly solubilizing the metal salt of the electrolyte. The plasticizers of the invention have characteristics consistent with desired electrolyte solvents, and they may constitute a portion of the solvent mixture.

The preferred characteristics of exemplary plasticizers of the invention are given in Table II. It is preferred that the solvent mixture of the electrolyte comprise an organic solvent selected from the group consisting of ethylene carbonate (EC), dimethyl carbonate (DMC), diethyl carbonate (DEC), dipropyl carbonate (DPC), dibutyl carbonate (DBC), diethoxy ethane (DEE), ethyl methyl carbonate (EMC), butylene carbonate (BC), vinylene carbonate (VC), propylene carbonate (PC), and mixtures thereof. Refer to Table III for solvent characteristics. The plasticizer is miscible with the other solvents and forms a part of the solvent mixture.

Although the plasticizer of the invention may remain as a part of the cell component after its fabrication, it is preferable to remove at least a portion of it. In any event, the solubilizing plasticizer of the invention, forming a part of the solvent mixture, is present in an amount not greater than the amount by weight of any other one of the organic solvent components. In an exemplary mixture, the solvent comprised EC/DMC in a weight proportion of 2:1, and also included the DMA plasticizer of the invention (dimethyl adipate). The DMA was present in an amount of 5 percent by weight of the solvent mixture, and the $EC/DMC/LiPF_6$ (1 M) constituted 95 percent by weight.

Preferred plasticizers are dimethyl adipate (DMA) and diethyl adipate (DEA). Dimethyl adipate is available from the Dupont Chemical Company and is available under the trade name "DBE-6", dibasic ester (dimethyl adipate), 99 percent purity. A 99 percent purity DMA is available from Aldrich Chemical Company, Inc., of Milwaukee, Wis. Physical characteristics of the dimethyl adipate available from both Dupont and Aldrich are given in Table II.

According to Aldrich and Dupont, the dimethyl adipate is synonymous with dimethyl hexanedionate, hexanedionic acid, dimethyl ester (9CI) and methyl adipate. Another commercially available formulation is DBE-4 product trade name, which represents a mixture of DMA and DEA.

It should be noted that the melting point of DMA is lower than the conventionally used DBP, therefore lamination of cell electrode and separator parts would need to be lowered. Such lamination presently occurs in a range of about 110 to 115° C., and such lamination preferably occurs with DMA at around 100° C.

Graphite and lithium metal oxide electrode active materials were used to prepare electrode formulations along with the novel plasticizer of the invention, and then tested in electrochemical cells. Test cells were also prepared having a polymeric separator formed with the plasticizer of the invention. Selected results are as recorded in FIGS. 1–8. A typical cell configuration will be described with reference to FIG. 9.

Figure 4:
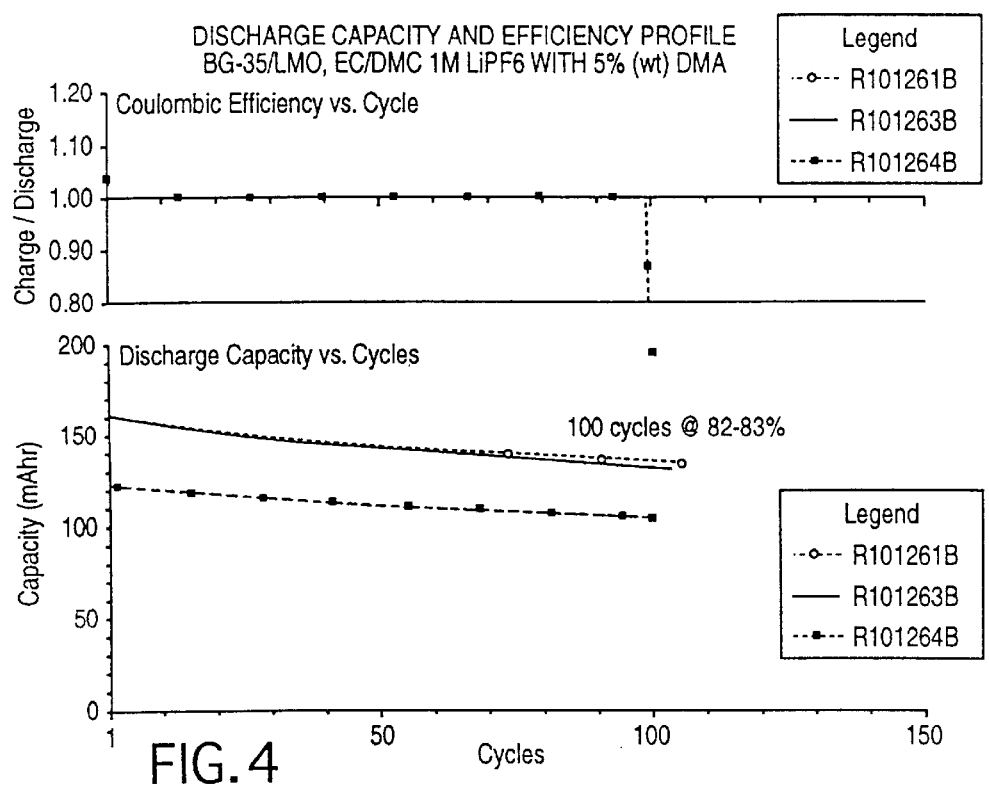
FIG. 4 is a two-part graph, with FIG. 4A showing coulombic efficiency versus cycles, and FIG. 4B showing discharge capacity versus cycles. The cells have BG-35 negative electrode (anode) and LMO (nominally $LiMn_2O_4$) positive electrode (cathode); the electrolyte is EC/DMC/ DMA:64.2% EC/30.8% DMC/5.0% DMA by weight, with 1M $LiPF_6$ salt.
Figure 9:
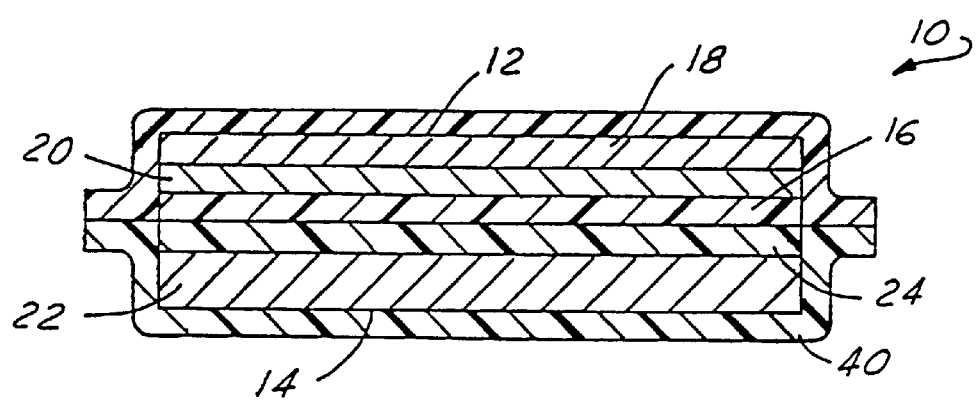
FIG. 9 is an illustration of a cross-section of a thin battery or cell embodying the invention.

The electrochemical cell or battery which uses the novel plasticizer of the invention will now be described, with reference to FIG. 9. By convention, an electrochemical cell comprises a first electrode, a counterelectrode, which reacts electrochemically with the first electrode, and an electrolyte which is capable of transferring ions between the electrodes. A battery refers to one or more electrochemical cells. Referring to FIG. 4, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes are typically referred to as polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. Essentially, any lithium ion containing conducting electrolyte may be used, that is stable up to 4.5 volts or more. Essentially any method may be used to maintain the positive and negative electrodes spaced apart and electrically insulated from one another in the cell. Accordingly, the essential features of the cell are the positive electrode, a negative electrode electrically insulated from the positive electrode, and an tonically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; 5,037,712; 5,418,091; 5,456,000; 5,460,904; 5,463,179; and 5,482,795. Each of the above patents is incorporated herein by reference in its entirety. Protective bagging material 40 covers the cell and prevents infiltration of air and moisture.

Electrodes of the invention are made by mixing a binder, plasticizer, the active material, and carbon powder (particles of carbon). The binder desirably is a polymer. The plasticizer is compatible with the polymer. A paste containing the binder, plasticizer, active material and carbon is coated onto a current collector. The positive electrode comprises a preferred lithium manganese oxide active material of the invention. For the positive electrode, the content is typically as follows: 60 to 80 percent by weight active material; 2 to 8 carbon black, as the electric conductive diluent; and 5 to 15 percent binder, preferably chosen to enhance ionic conductivity; and 10 to 25 weight percent plasticizer. Stated ranges are not critical. The amount of active material may vary. These materials are mixed and blended together with a casting solvent. Acetone is a suitable solvent. The mixture is then coated onto a glass plate to achieve the desired thickness for the final electrode. The negative electrode of the invention preferably comprises about 55 to 75 percent by weight of graphite active material, and more preferably, 60 to 70 percent by weight, with the balance constituted by the binder and preferred plasticizer. Preferably, the negative electrode is prepared from a slurry, which is coated onto a glass plate using conventional casting techniques as described with respect to the positive electrode.

The electrolyte used to form a completed cell comprises an organic solvent or solvent mixture with preferred solvents as shown in Table III. The solvent also comprises the plasticizer of the invention in an amount up to about 35 weight percent. The solvent contains typically a one molar solution of a lithium metal salt, such as LiPF6. The positive and negative electrodes are maintained in a separated, spaced-apart condition using a fiberglass layer or separator of an equivalent design. In an alternative embodiment, the separator between the electrodes is also formed from a polymer formulation using the plasticizer of the invention.

The electrochemical cell which utilizes the novel plasticizer of the invention may be prepared in a variety of ways. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, test cells were fabricated using lithium metal electrodes. When forming cells for use as batteries, it is preferred to use an intercalation metal oxide positive electrode and a graphitic carbon negative electrode.

Various methods for fabricating electrochemical cells and batteries and for forming electrode components are further described immediately below. The invention is not, however, limited by any particular fabrication method as the novelty lies in the unique electrolyte. Accordingly, additional methods for preparing electrochemical cells and batteries may be selected and are described in the art, for example, in U.S. Pat. No. 5,435,054 (Tonder & Shackle); U.S. Pat. No. 5,300,373 (Shackle); U.S. Pat. No. 5,262,253 (Golovin); U.S. Pat. Nos. 4,668,595; 4,830,939 (Lee & Shackle); and particularly U.S. Pat. No. 5,418,091; 5,456, 000; 5,460,904, and 5,540,741 assigned to Bell Communication Research. Each of the above patents is incorporated herein by reference in its entirety.

EXAMPLE I

A graphite electrode was fabricated by solvent casting a slurry of BG-35 graphite, binder, plasticizer, and casting solvent. The graphite, BG-35, was supplied by Superior Graphite Corporation, Chicago, Ill. The BG series is a high purity graphite derived from a flaked natural graphite purified by heat treatment process. The physical features are given in Table IV. The binder was a copolymer of polyvinylidene difluoride (PVDF) and hexafluoropropylene (HFP) in a molar ratio of PVDF to HFP of 88:12. This binder is sold under the designation of Kynar Flex 2801®, showing it is a registered trademark. Kynar Flex is available from Atochem Corporation. The plasticizer was dimethyl adipate. An electronic grade casting solvent was used. The slurry was cast onto glass and a free-standing electrode was formed as the casting solvent evaporated. The slurry composition for the negative electrode was as follows:

| Component | Wet Weight % | Dry Weight % |
|---|---|---|
| Graphite | 23.4 | 56.0 |
| Super P | 0.9 | 2.2 |
| Binder | 6.8 | 16.4 |
| Plasticizer | 10.5 | 25.4 |
| Solvent | 58.4 | — |
| Total | 100.0 | 100.0 |

The counter-electrode was lithium metal. A glass fiber separator was used between the electrodes to prevent them from electrically shorting. An electrochemical cell of the first electrode, separator, and counter-electrode was formed.

The electrolyte used to form the completed final cell or battery comprised a solution of 95 percent by weight EC/DMC and 5 percent by weight DMA, which remained after formation of the electrode. The weight ratio of EC to DMC was 2:1. The solvent included one molar $LiPF_6$ salt. The two electrodes were maintained in separated condition using a fiberglass layer. The electrolyte solution interpenetrated the void spaces of the fiberglass layer. The results of constant current cycling are shown in FIG. 1. FIG. 1 shows a voltage/capacity plot of BG-35 graphite cycled with a lithium metal electrode using constant current cycling at ±0.2 milliamps per square centimeter, between 0.01 and 2.0 volts vs. Li/Li$^+$. In FIG. 1, the results of cycling two similar cells are shown. One cell is designated LO147900 (1479) and the other is LO148000 (1480). The data for the 1479 cell is given below, followed directly by the data for the 1480 cell stated in parentheses. The cycling data was obtained using 42 (40) milligrams of the BG-35 active material. The electrolyte is as stated above. The test was conducted under ambient conditions. In the first half-cycle, lithium is removed from metallic electrode and intercalated into the graphite electrode. Once essentially full intercalation at the graphite electrode was completed, corresponding to about $Li_1C_6$, the voltage had dropped to approximately 0.1 volts, representing about 400 (335) milliamp hours per gram, corresponding to about 16.8 (13.4) milliamp hours, based on the 42 (40) milligrams of active material. In the second-half cycle, lithium is de-intercalated from the graphite and returned to the metallic electrode, until the average voltage is approximately 2 volts vs. Li/Li$^+$. The deintercalation corresponds to approximately 352 (295) milliamp hours per gram, representing approximately 14.8 (11.8) milliamp hours, based on the 42 (40) milligrams of active material. This completes an initial cycle. The percentage difference between the 16.8 (13.4) milliamp hours per gram capacity "in" and the 14.8 (11.8) milliamp hours per gram capacity "out", divided by the initial 16.8 (13.4) capacity "in" corresponds to a surprisingly low 12 percent first cycle loss for each of cells 1479 and 1480.

EXAMPLE II

Figure 2:
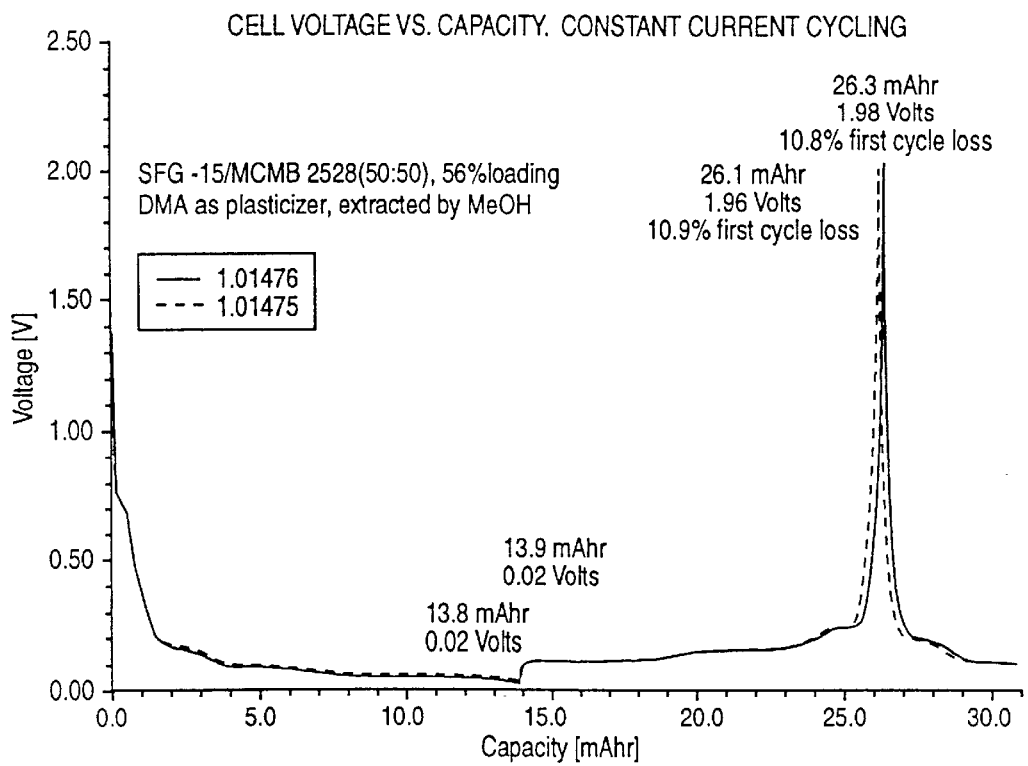
FIG. 2 is a voltage/capacity plot similar to that described for FIG. 1. The graphite is SFG-15/MCMB 2528 in a 50:50 weight ratio.
Figure 3:
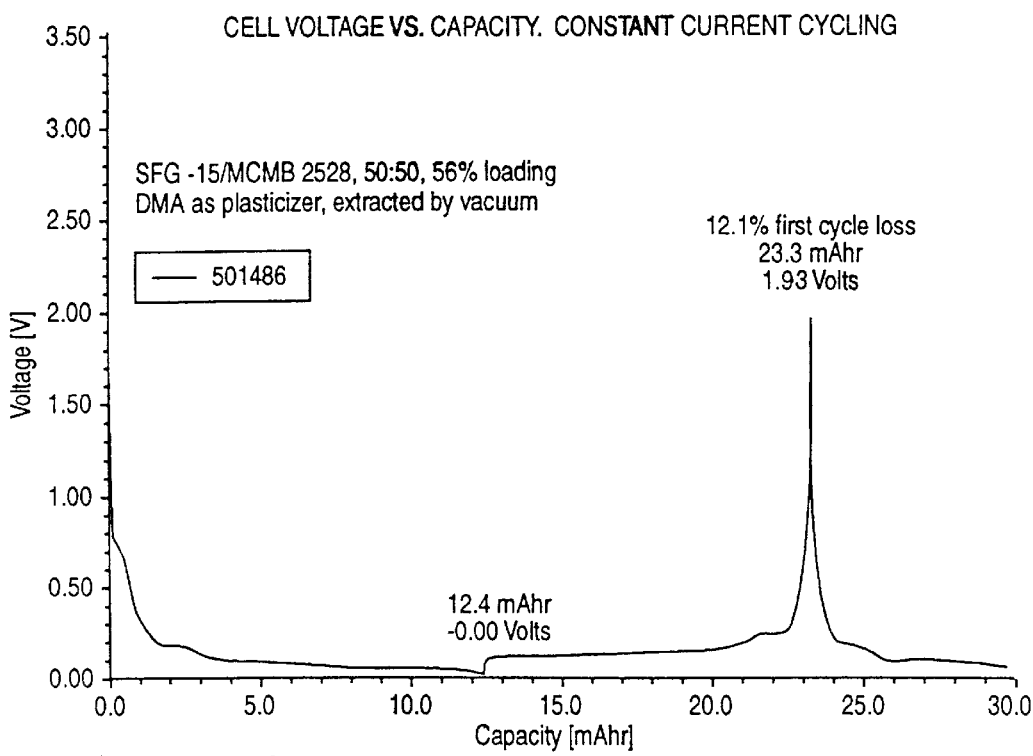
FIG. 3 shows voltage/capacity plot for an electrode formulation prepared similar to FIG. 2, except that the plasticizer was essentially completely extracted by vacuum extraction.

The flexibility of the plasticizer of the invention can be further understood by reference to the following examples and the results shown in FIGS. 2 and 3. For comparative purposes, electrodes were prepared using DMA as plasticizer, as mentioned above, but having DMA extracted after formation of the electrode. Methanol was used as the extraction solvent. Graphite electrodes were prepared as described in Example I and according to the weight proportions shown therein, except that the graphite was a combination of SFG-15 and MCMB 2528 in a 50:50 weight ratio. The electrodes comprised 36 milligrams of active material. The area of the electrodes used in FIGS. 2 and 3 are the same as that shown in FIG. 1, namely 2.4 sq. centimeters. The aforesaid 36 milligrams of graphite active material corresponds to a 56 percent loading. The electrode slurry casting formulation comprised, on a weight basis: 25.4% DMA; 56% Graphite (50% SFG-15/50% MCMB 2528); 16.4% Kynar 2801 (PVDF:HFP); and 2.2% Super P (MMM Carbon) carbon black.

FIG. 2 shows a voltage/capacity plot of SFG-15 and MCMB, 2528,X 50:50 graphite cycled with a lithium metal electrode using constant current cycling at ±0.2 milliamps per square centimeter, between 0.01 and 2 volts vs. Li/Li$^+$. In FIG. 2, the results of cycling two similar cells are shown. One cell is designated LO01475 (1475) and the other is LO1476 (1476). The data for the 1475 cell is given below, followed directly by the data for the 1476 cell stated in parentheses. The cycling data was obtained using 36 milligrams of the active material. The electrolyte is one molar LiPF$_6$ in a solution of EC/DMC in a 2:1 weight ratio. In this case, essentially all of the DMA was extracted by methanol. Therefore, DMA did not form a detectable part of the solvent solution. As in the case with respect to FIG. 1, in the first-half cycle, lithium is removed from the metallic electrode and intercalated into the graphite electrode. When essentially full intercalation of the graphite electrode is complete, corresponding to LiC$_6$, the voltage has dropped to approximately 0.01 volts, representing about 383 (386) milliamp hours per gram, corresponding to about 13.8 (13.9) milliamp hours, based on 36 (36) milligrams of active material. In the second half cycle, the lithium is deintercalated from the graphite and returned to the metallic electrode until the average voltage is approximately 2 volts vs. Li/Li$^+$. The deintercalation corresponds to approximately 341 (344) milliamp hours per gram, representing approximately 12.3 (12.4) milliamp hours based on 36 (36) milligrams of active material. This completes an initial cycle. The percentage difference between the 13.8 (13.9) milliamp hours per gram capacity "in" and the 12.3 (12.4) milliamp hours per gram capacity "out", divided by the initial 13.8 (13.9) capacity "in", corresponds to a surprisingly low first cycle loss. As shown in FIG. 2, for the two cells (1475 and 1476) tested; the first exhibited a first cycle loss of 10.9 percent, and the second exhibited a first cycle loss of 10.8 percent.

EXAMPLE III

A graphite electrode was fabricated in the same manner as described for Example II, except that the DMA plasticizer was at least partially removed by vacuum. FIG. 3 shows a voltage capacity plot of the SFG-15/MCMB 2528 electrode cycled with a lithium metal electrode, using constant current cycling at ±0.2 milliamps per square centimeter, between 0.01 and 2.0 volts vs. Li/Li$^+$, using 35 milligrams of the graphite active material. The electrolyte is one molar LiPF$_6$ in a solution of EC/DMC in a 2:1 weight ratio. In this case, essentially all of the DMA was extracted by vacuum. Therefore, DMA did not form a detectable part of the solvent solution. No DMA was in the electrolyte. In the first half cycle, lithium is removed from the metallic electrode and intercalated into the graphite electrode as described above. Then, the lithium is deintercalated from the graphite and returned to the metallic electrode, as described in the examples above. The percentage difference between the 12.4 milliamp hours per gram capacity "in" and the 10.9 milliamp hours per gram capacity "out", divided by the initial 12.4 capacity "in", corresponds to a surprisingly low 12 percent first cycle loss. It can be seen again that DMA may successfully remain in the cell as a plasticizer without extraction, or extraction may be done if desired. The capacity of the cell is not affected by the DMA due to electrochemical stability of the DMA and its suitability to form a portion of the solvent mixture.

EXAMPLE IV

Positive electrodes were also fabricated by solvent casting of the invention, casting a slurry of lithium manganese oxide, conductive carbon, binder, plasticizer and solvent, as in a manner similar to Example I. A preferred lithium manganese oxide (LMO) cathode was formed, and the lithium manganese oxide was LiMn$_2$O$_4$, supplied by Kerr-McGee (Soda Springs, Id.); and the conductive carbon was Super P, available from MMM carbon. Kynar Flex co-polymer, described above, was used as the binder, along with the preferred plasticizer of the invention. Electronic grade acetone was used as a casting solvent. The cathode slurry was cast onto aluminum foil coated with polyacrylic acid/conductive carbon mixture. The slurry was cast onto glass, and a free-standing electrode was formed as the solvent evaporated. An exemplary cathode slurry composition is as follows:

| Component | Wet Weight % | Dry Weight % |
|---|---|---|
| LiMn$_2$O$_4$ | 28.9 | 65.0 |
| Super P | 2.5 | 5.5 |
| Binder | 4.5 | 10.0 |
| Plasticizer | 8.7 | 19.5 |
| Solvent | 55.4 | — |
| Total | 100.0 | 100.0 |

Positive electrodes for cells are easily prepared, as noted above, using the preferred plasticizer. The plasticizer may be removed, only partially removed, or remain in the cell in accordance with the examples described above with respect to the negative electrode.

EXAMPLE V (5% DMA Solvent)

Graphite (BG-35) and LMO electrodes, prepared as described above, were tested in a cell having an electrolyte composition comprising DMA. The electrolyte used to form the completed final cell, or battery, comprised of solution of 95% by weight EC/DMC and 5 weight % DMA. The electrolyte salt was one molar LiPF$_6$. The weight ratio of EC to DMC was 2:1. The two electrode layers were arranged with an electrolyte layer in between, and the layers were laminated together using heat and pressure as per the Bell Communication Research patents listed earlier.

FIG. 4 contains the results of testing of three cells with cell designated 1261 showing data points with open squares, cell 1263 data in the form of a straight line, and cell 1264 showing data designated with filled-in boxes. FIG. 4 is a two-part graph. FIG. 4A shows the good rechargeability of the LMO/BG-35 graphite cells. FIG. 4B shows the good cycling and capacity of the cells. Charge and discharge are at ±2.0 amp hours per centimeter square, between 3.0 and 4.2 volts for up to about 100 cycles. In FIG. 4A, the coulombic efficiency versus cycle is very good. In FIG. 4B, after 100 cycles, approximately 82–83% capacity is maintained.

EXAMPLE VI (10% DMA Solvent)

Cells were prepared as per Example V, except that the solvent mixture contained a greater proportion by weight of DMA.

Graphite (BG-35) and LMO electrodes, prepared as described above, were tested in a cell having an electrolyte solution of 90% by weight EC/DMC and 10 weight % DMA. The electrolyte salt was one molar LiPF$_6$. The weight ratio of EC to DMC was 2:1. The two electrode layers were laminated with the electrolyte layer in between as described above.

Figure 5:
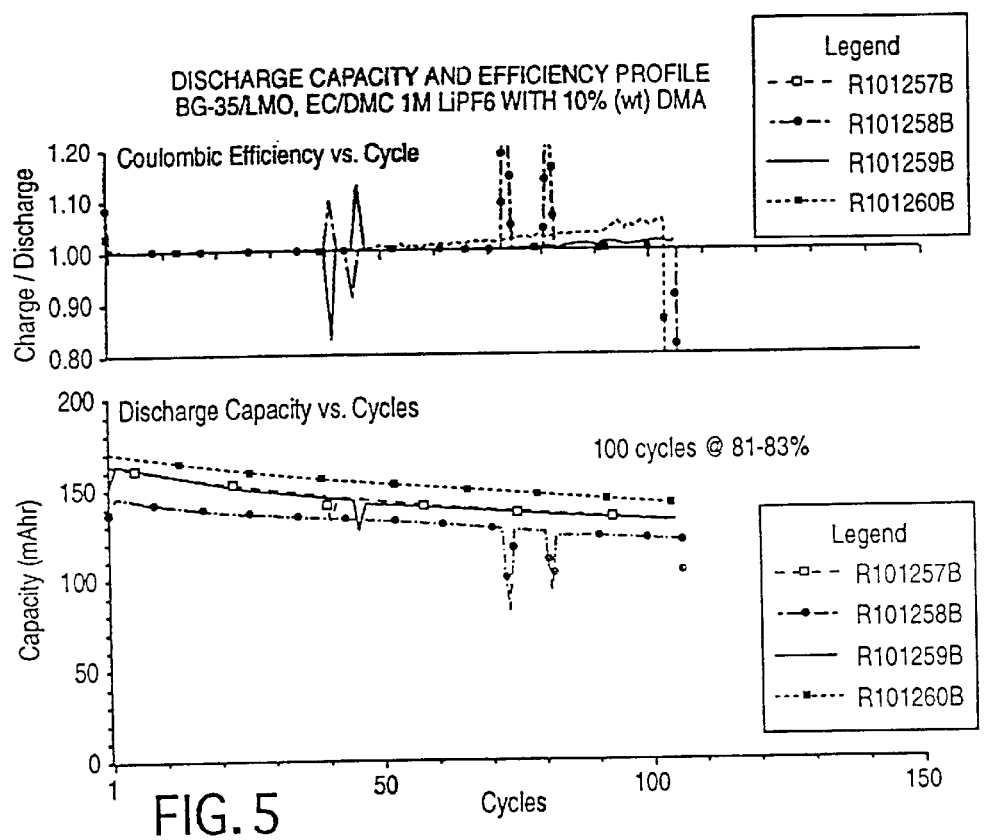
FIG. 5 is a two-part graph, with FIG. 5A showing coulombic efficiency versus cycles, and FIG. 5B showing discharge capacity versus cycles. The cells have the same BG-35/LMO electrodes and salt as FIG. 4, but the solvent weight ratio is 53.3% EC/26.7% DMC/20.0% DMA.

FIG. 5 contains the results of testing of four cells with cell designated 1257 showing data points with open squares, cell 1259 data in the form of a straight line, cell 1260 showing data designated with filled-in boxes, and cell 1258 data shown as filled-in circles. FIG. 5 is a two-part graph. FIG. 5A shows the excellent rechargeability of the LMO/BG-35 graphite cells. FIG. 5B shows the excellent cycling and capacity of the cells. Charge and discharge are under same conditions as Example V. In FIG. 5A, the coulombic efficiency versus cycle is very good, and in FIG. 5B, it can be seen that after 100 cycles, approximately 81–83% capacity is maintained.

EXAMPLE VII (20% DMA Solvent)

Graphite (BG-35) and LMO electrodes, prepared as described above, were tested in a cell having an electrolyte solution of 80% by weight EC/DMC and 20 weight % DMA. The electrolyte salt was one molar LiPF$_6$. The weight ratio of EC to DMC was 2:1. The two electrode layers were laminated with the electrolyte layer in between as described above.

Figure 6:
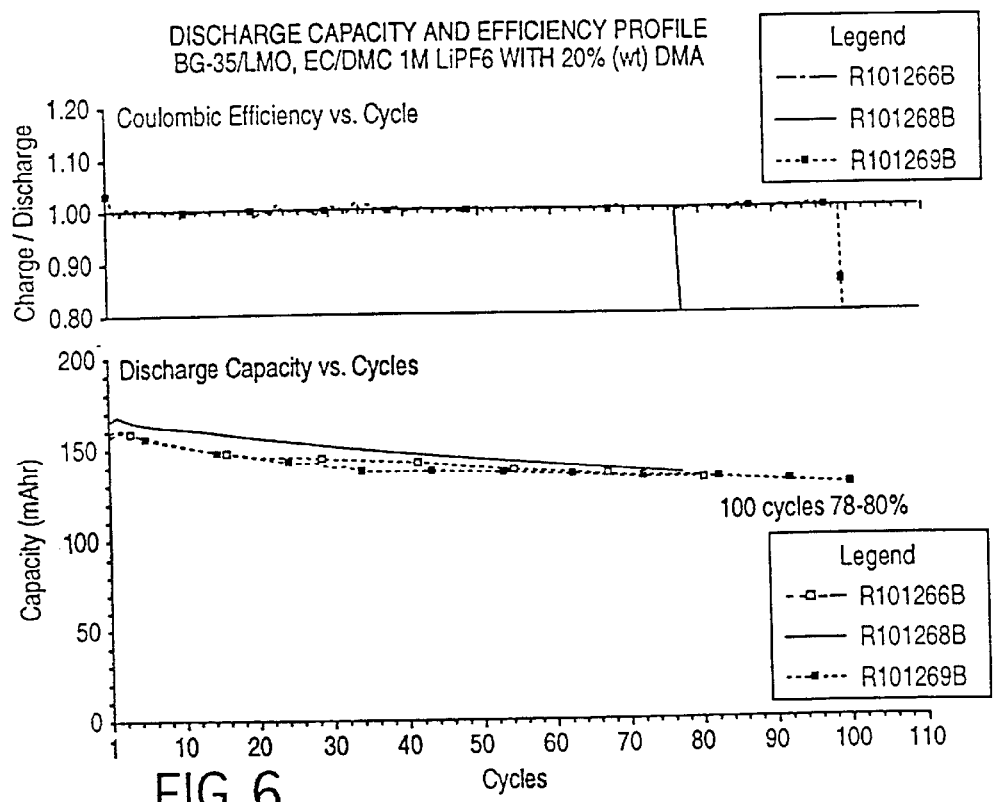
FIG. 6 is a two-part graph, with FIG. 6A showing coulombic efficiency versus cycles, and FIG. 6B showing discharge capacity versus cycles. The cells have the same BG-35/LMO electrodes and salt as FIG. 4, but the solvent weight ratio is 60% EC/30% DMC/10% DMA.
Figure 7:
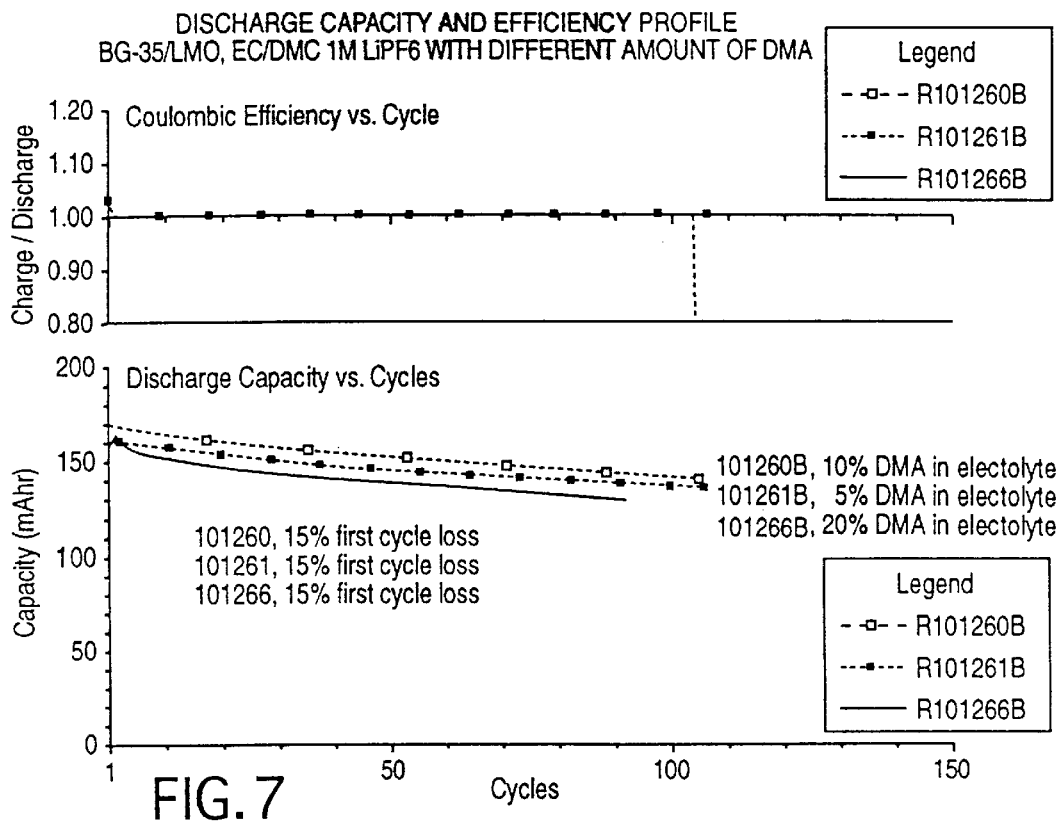
FIG. 7 shows cycling performance of respective 5%, 10% and 20% DMA cells taken from FIGS. 4, 5 and 6.

FIG. 6 contains the results of testing of three cells with cell designated 1266 showing data points with open squares, cell 1268 data in the form of a straight line, and cell 1269 showing data designated with filled-in boxes. FIG. 6 is a two-part graph. FIG. 6A shows the good rechargeability of the LMO/BG-35 graphite cells. FIG. 6B shows the good cycling and capacity of the cells. Charge and discharge are under the same conditions as Example V. In FIG. 6A, the coulombic efficiency versus cycle is very good, and in FIG. 6B, it can be seen that after 100 cycles, approximately 78–80% capacity is maintained.

To further emphasize the good coulombic efficiency and discharge capacity versus cycles, exemplary data from the 5% DMA (Example V), 10% DMA (Example VI), and 20% DMA (Example VII) were combined in single graph. This can be seen in FIG. 7.

EXAMPLE VIII

Figure 8:
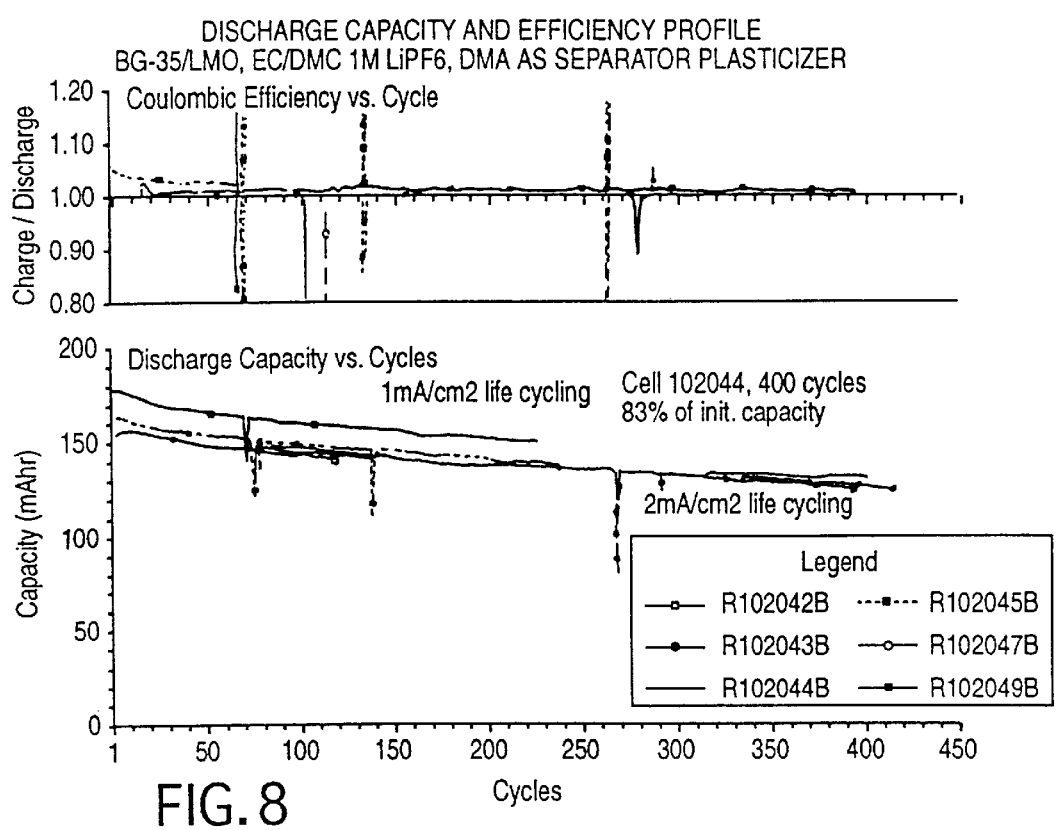
FIG. 8 is a two-part graph, with FIG. 8A showing coulombic efficiency versus cycles, and FIG. 8B showing discharge capacity versus cycles. The cells are BG-35/LMO, EC/DMC 1 M $LiPF_6$, with DMA as separator plasticizer.

Several cells were prepared, similar to the aforesaid examples of graphite and LMO electrodes, but also using a separator formed with the DMA plasticizer of the invention. The six cells were SFG-15/MCMB 2528, 50:50, 56% active material. In this case, the DMA was totally removed after the cell was laminated and before activation with the electrolyte. Therefore, the electrode and separator preparation with the removal of the DMA was similar to the processes described earlier with respect to FIGS. 2 and 3, where the DMA plasticizer was totally removed. The results of testing the six cells are shown in FIG. 8. Cell 2042 is shown by a dashed line with open squares; cell 2043 is shown by a dashed line with dots; cell 2044 data is designated by a gray line; data for cell 2045 is shown by a dashed line with filled-in squares; data for cell 2047 is shown by a solid line with open squares; and data for cell 2049 is shown by a fixed solid line with large black (filled-in) squares. The data of FIG. 8 clearly demonstrates that DMA is a stable alternate plasticizer and provides performance for electrodes and separators equivalent to that obtained with conventional DBP plasticizer. FIG. 8A shows that coulombic efficiency is maintained for as many as 400 cycles. FIG. 8B shows that in the case of cell 2044 after 400 cycles, 83% of initial capacity is maintained, at 2 milliamps per centimeter square life cycling. The data obtained at one milliamp per centimeter square life cycling for less than 250 cycles is also shown for comparative purposes.

Reviewing the data in the various figures, it is clear that DMA is acceptable for use as a plasticizer for separator polymeric electrolyte layer, and that it is not necessary to remove it before the activation step. The activation step indicates the step at which electrolyte solvent and salt is added-to the cell. Therefore, it is possible to include DMA as a portion of the electrolyte solvent salt mixture. It is also acceptable to use DMA as plasticizer in each laminate layer of the cell, anode, cathode, and separator, and it is not necessary to remove it, thus permitting it to form a part of the cell solvent mixture. Under current processing techniques, the extraction step currently practiced for removing the plasticizer is useful for removing water. Therefore, it is unlikely that all plasticizer will be permitted to remain in the cell, since its extraction is coincident with water removal. However, since the DMA is a stable plasticizer, one not need be concerned with removing DMA down to a point of nearly undetectable amounts, as is presently done in the case of DBP. DMA was included as part of the electrolyte formulation to prove its electrochemical stability in FIGS. 1, 4, 5, 6, and 7, and this stability was clearly proven. It is suggested that the greatest amount of DMA includable in the electrolyte system preferably up to about 20%. As shown in FIGS. 4 through 7, BG-35/LMO cells with 5–20 weight percent of DMA in the electrolyte all show reasonable first-cycle loss. These first-cycle losses ranged from 14–19 percent, and cycling performance was 78–82 percent, after about 100 cycles. Therefore, it appears that up to 20% DMA in the electrolyte formulation is acceptable. In that regard, FIGS. 2 and 3 show graphite half-cells, where the DMA plasticizer was totally removed by methanol (FIG. 2) or vacuum extraction (FIG. 3). In comparing FIGS. 1, 2, and 3, it can be seen that all three cells show reasonable first-cycle loss (10.8–12.1%). FIG. 8 demonstrates using DMA as the separator plasticizer, where DMA was totally removed before the activation step, showing it to be a stable alternate plasticizer for processing.

When reviewing the data of all of the FIGS. 1 through 8, several conclusions are obtained. The first cycle loss, when using DMA as a plasticizer, is relatively low. The first cycle loss, when using DMA as a part of the electrolyte is also relatively low. This demonstrates the electrochemical stability of DMA. The good capacity retention and cyclability is demonstrated for the various conditions, both half-cells and full cells, for FIGS. 1 through 8. Therefore, it is possible to conclude that the DMA is a very good alternate plasticizer for processing (FIGS. 2, 3, and 8) and it also has the potential for not being removed before cell activation with the electrolyte. That is, it shows great potential for saving process time and cost by remaining in the cell as part of the electrolyte solvent in an amount of up to about 20 wt percent DMA, based on the formulation shown herein of 20 weight percent DMA; and 80% EC/DMC (2:1 ratio) with one molar $LiPF_6$.

Additional physical features of the polymer binder, plasticizer, active materials, and additives (such as fillers) will now be described.

The plasticizer of the invention is not limited for use with co-polymers of vinylidene fluoride and hexafluoropropylene. The polymeric material for use with the plasticizers of the invention may be selected from a broader class. More particularly, the polymer may be selected from polymers and copolymers of vinyl chloride, acrylonitrile, vinylidene fluoride, vinyl chloride and vinylidene chloride, vinyl chloride and acrylonitrile, vinylidene fluoride with hexafluoropropylene, vinylidene fluoride with hexafluoropropylene and a member of the group consisting of vinyl fluoride, tetrafluoroethylene, an trifluoroethylene. The preferred polymer composition is a copolymer of VdF and HFP, more preferably, the polymer composition is 75 to 92% vinylidene fluoride and 8 to 25% hexafluoropropylene. These copolymers are available commercially from, for example, Atochem North America as Kynar FLEX. This polymer composition is preferred for both the preparation of the electrodes and the separator membrane.

Inorganic fillers, such as fumed alumina or silanized fumed silica, may be used to enhance the physical strength and melt viscosity of the solid-state components, namely, the electrodes and separators, and to facilitate absorption of electrolyte solution in the completed cell. The active materials for inclusion in the positive electrode are not limited and may include any of a number of conventionally used positive electrode active materials such as $LiMn_2O_4$, $LiCoO_2$, and $LiNiO_2$. Active materials for inclusion in the negative electrode include petroleum coke, microbead carbon coke, synthetic graphite, natural graphite, synthetic graphitized carbon fibers and whiskers, and metal oxides. Those skilled in the art will understand that metal chalcogenides may be used as positive and negative electrode active materials. Completed cells are formed by laminating the electrodes and separator membranes described above, under heat and pressure, to form a unitary battery structure. The battery is activated by including the electrolyte solution comprising the solvent and metal salt.

TABLE I $$RO-\underset{\parallel}{\overset{O}{C}}-(CH_2)_4-\underset{\parallel}{\overset{O}{C}}-OR$$

$$CH_3O-\underset{\parallel}{\overset{O}{C}}-(CH_2)_4-\underset{\parallel}{\overset{O}{C}}-OCH_3$$

DMA (dimethyl adipate, CAS# 627-93-0)
dibasic ester

TABLE II

| Dibasic Ester Dimethyl Adipate DMA | |
|---|---|
| Boiling Point | 109° C. to 110° C. |
| Melting Point | 8° C. |
| Vapor Pressure (20° C.) | 0.2 mm |
| Specific Gravity | 1.063 |
| Appearance | Colorless Liquid |
| Purity | 98–99% |

TABLE III

| Characteristics of Organic Solvents | | | | |
|---|---|---|---|---|
| | PC | VC | EC | DMC |
| Boiling Temperature (C) | 240 | 162 | 248 | 91.0 |
| Melting Temperature (C) | −49 | 22 | 39–40 | 4.6 |
| Density (g/cm³) | 1.198 | 1.35 | 1.322 | 1.071 |

TABLE III-continued

| Characteristics of Organic Solvents | | | | |
|---|---|---|---|---|
| Solution Conductivity (S/cm) | 2.1 × 10$^{-9}$ | — | <10$^{-7}$ | <10$^{-7}$ |
| Viscosity (cp) at 25° C. | 2.5 | — | 1.86 (at 40° C.) | 0.59 |
| Dielectric Constant at 20° C. | 64.4 | — | 89.6 (at 40° C.) | 3.12 |
| Molecular weight | 102.0 | 86.047 | 88.1 | 90.08 |
| H$_2$O Content | <10 ppm | — | <10 ppm | <10 ppm |
| Electrolytic Conductivity (mS/cm) 20° C. 1M LiAsF$_6$ | 5.28 | — | 6.97 | 11.00 (1.9 mol) |
| | DEC | BC | MEC | DPC |
| Boiling Temperature (C) | 126 | 230 | 107 | 167–168 |
| Melting Temperature (C) | −43 | — | −55 | — |
| Density (g/cm$^3$) | 0.98 | 1.139 | 1.007 | 0.944 |
| Solution Conductivity (S/cm) | <10$^{-7}$ | <10$^{-7}$ | 6 × 10$^{-9}$ | <10$^{-7}$ |
| Viscosity (cp) at 25° C. | 0.75 | 2.52 | 0.65 | — |
| Dielectric Constant at 20° C. | 2.82 | — | — | — |
| Molecular weight | 118.13 | 116.12 | 104.10 | 146.19 |
| H$_2$O Content | <10 ppm | <10 ppm | <10 ppm | <10 ppm |
| Electrolytic Conductivity (mS/cm) 20° C. 1M LiAsF$_6$ | 5.00 (1.5 mol) | <3.7 | — | — |

TABLE IV

| Carbon Material | BG-35 | SFG-15 | MCMB-2528 |
|---|---|---|---|
| Surface Area (m$^2$/g) (BET) | 7 | 8.8 | N/A |
| Coherence Length L$_c$ (nm) | >1000 | >120 | >1000 |
| Density (g/cm$^3$)[2] | 0.195 | 2.26 | 2.24 |
| Particle Size[1] | <36 | <16 | 37 |
| Median Size d$_{50}$ (μm) | 17 | 8.1 | 22.5 |
| Interlayer Distance c/2 (nm) | N/A | 0.335 | 0.336 |

[1]Maximum size for at least 90% by weight of graphite particles.
[2]In xylene.

In summary, the invention solves the difficult processing problems associated with removal of conventional plasticizers after formation of cell components and before their assembly into a cell. Plasticizers such as DBP have always been a problem, since DBP readily decomposes when subjected to conditions of cyclic operation in an electrochemical cell. Although DBP and similar compounds have been popular as plasticizers, their deterioration due to electrochemical instability is highly problematic. In contrast, the plasticizer family of the invention, which comprises adipate derivatives, esters, are highly desirable and have a wide voltage operating range while avoiding decomposition in a cell.

While this invention has been described in terms of certain embodiments thereof, it is not intended that it be limited to the above description, but rather only to the extent set forth in the following claims.

The embodiments of the invention in which an exclusive property or privilege is claimed, are defined in the following claims:

What is claimed is:
1. A method of making a rechargeable battery structure, which structure comprises, in sequence, a positive electrode element, a separator element, and a negative electrode element, characterized in that each of said electrode and separator elements comprises a flexible, polymeric matrix composition; said method comprising forming a mixture comprising a casting solvent, a polymeric material and a plasticizer, said plasticizer for at least one of said elements being a compound represented by the following general formula

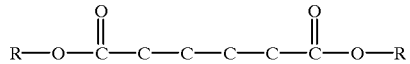

where R is a low alkyl having up to six carbon atoms; casting the mixture and removing said casting solvent to form a self-supporting film of said flexible, polymeric matrix composition; bonding each said element to contiguous elements at its respective interface to form a unitary flexible laminate structure; and then optionally removing a portion of said plasticizer from said laminate structure, wherein a portion of said plasticizer remains part of said battery structure.

2. The method according to claim 1 where R is a low alkyl selected from methyl, ethyl, butyl, pentyl and hexyl.

3. The method according to claim 1 wherein said plasticizer is further characterized by electrochemical stability up to about 4.5 volts.

4. The method according to claim 1 wherein said polymeric material is a copolymer of VdF (vinylidene fluoride) and HFP (hexafluoropropylene).

5. The method according to claim 1 wherein said plasticizer for each of said elements is represented by said general formula.

6. An electrochemical cell which comprises a first electrode; a counter electrode which forms an electrochemical couple with said first electrode; and an electrolyte; said electrolyte comprising a solute, and a solvent mixture; said solute consisting essentially of a salt of a metal; and at least one of said electrodes comprising:
an active material;
a polymeric material; and
a plasticizer for said polymeric material wherein said plasticizer is at least one compound selected from the group consisting of compounds represented by the following general formula

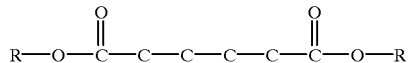

where R is a low alkyl selected from the group consisting of methyl, ethyl, propyl, butyl, pentyl and hexyl.

7. The cell according to claim 6 wherein said plasticizer is further characterized by electrochemical stability up to about 4.5 volts.

8. The cell according to claim 6 wherein said plasticizer is further characterized by disassociatingly solubilizing said metal salt.

9. An electrochemical cell which comprises a first electrode; a counter electrode which forms an electrochemical couple with said first electrode; and an electrolyte; said electrolyte comprising a solute, and a solvent mixture; said solute consisting essentially of a salt of a metal; and at least one of said electrodes comprising:
an active material;
a polymeric material;
a plasticizer for said polymeric material wherein said plasticizer is at least one compound selected from the group consisting of compounds represented by the following general formula

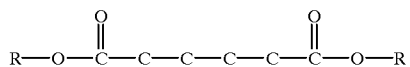

where R is a low alkyl selected from methyl, ethyl, propyl, butyl, pentyl and hexyl;
wherein said plasticizer constitutes a portion of said solvent mixture.

10. The cell according to claim 9 wherein said solvent mixture comprises, besides said plasticizer, at least one other solvent selected from the group consisting of ethylene carbonate (EC), dimethyl carbonate (DMC), diethyl carbonate (DEC), dipropyl carbonate (DPC), dibutyl carbonate (DBC), diethoxy ethane (DEE), ethyl methyl carbonate (EMC), butylene carbonate (BC), vinylene carbonate (VC), propylene carbonate (PC), and mixtures thereof.

11. An electrochemical cell which comprises a first electrode; a counter electrode which forms an electrochemical couple with said first electrode; and an electrolyte; said electrolyte comprising a solute, and a solvent mixture; said solute consisting essentially of a salt of a metal; and at least one of said electrodes comprising:
an active material;
a polymeric material;
a plasticizer for said polymeric material wherein said plasticizer is at least one compound selected from the group consisting of compounds represented by the following general formula

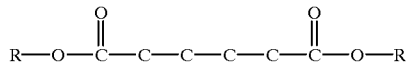

where R is a low alkyl selected from methyl, ethyl, propyl, butyl, pentyl and hexyl;
wherein said first electrode active material is selected from the group consisting of lithium manganese oxide, lithium nickel oxide and lithium cobalt oxide; and said first electrode polymeric material is a copolymer of VdF (vinylidene fluoride) and HFP (hexafluoropropylene).

12. An electrochemical cell which comprises a first electrode; a counter electrode which forms an electrochemical couple with said first electrode; and an electrolyte; said electrolyte comprising a solute, and a solvent mixture; said solute consisting essentially of a salt of a metal; and at least one of said electrodes comprising:
an active material;
a polymeric material;
a plasticizer for said polymeric material wherein said plasticizer is at least one compound selected from the group consisting of compounds represented by the following general formula

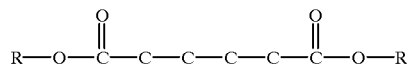

where R is a low alkyl selected from methyl, ethyl, propyl, butyl, pentyl and hexyl;
wherein said counter-electrode active material is selected from the group consisting of non-graphitic amorphous coke, graphitic carbon, graphites, and mixtures thereof; and said counter-electrode polymeric material is a copolymer of VdF (vinylidene fluoride) and HFP (hexafluoropropylene).

13. An electrochemical cell which comprises a first electrode; a counter electrode which forms an electrochemical couple with said first electrode; a separator, disposed between said first electrode and said counter-electrode, and an electrolyte; said electrolyte comprising a solute, and a solvent mixture; said solute consisting essentially of a salt of a metal; and at least one of said electrodes comprising:
an active material;
a polymeric material; and
a plasticizer for said polymeric material wherein said plasticizer is at least one compound selected from the group consisting of compounds represented by the following general formula

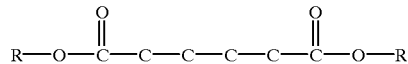

where R is a low alkyl selected from the group consisting of methyl, ethyl, propyl, butyl, pentyl and hexyl, wherein said plasticizer and said solubilized salt are distributed within said separator; said separator is in the form of a solid matrix forming a network with voids interpenetrated by said plasticizer and salt; and said matrix is selected from the group consisting of polymeric acrylate, porous polypropylene, porous polyethylene, and glass fiber material.

* * * * *